Patented Jan. 7, 1936

2,026,731

UNITED STATES PATENT OFFICE 2,026,731

PROCESS FOR THE PRODUCTION OF UN-SATURATED HYDROCARBONS FROM PARAFFINS

Henry Dreyfus, London, England

No Drawing. Application March 18, 1933, Serial No. 661,567. In Great Britain April 28, 1932

6 Claims. (Cl. 260—170)

This invention relates to improvements in the treatment of paraffin hydrocarbons, and especially gaseous paraffin hydrocarbons, for the purpose of converting them into more valuable products.

It is well known that in the cracking of oils, and particularly petroleum oils, a considerable percentage of the gaseous products are the valuable olefines. Depending on the temperature and other conditions of the cracking operation, paraffin hydrocarbons, both gaseous and liquid, may result from the cracking treatment in more or less large quantities. These paraffins are much less valuable for commercial purposes than are the olefines, and the present invention is concerned with the conversion of such paraffins, and particularly gaseous paraffins, into more valuable products and especially olefinic products. The paraffins for the purpose of the present invention may be derived from any suitable source, but in particular they may be derived from the cracking of oils as referred to.

I have found that the paraffin hydrocarbons may be converted into more valuable products which contain a lower percentage of hydrogen, and in particular into products which are olefinic or even acetylenic in character, by treatment at elevated temperatures in presence of carbon, or compositions or compounds rich in carbon, and particularly compositions or compounds which are liquid at the temperature of treatment. For example compositions or compounds containing above 80% and especially above 90% of carbon may be employed, while, especially when carbon is present in the free state, compositions containing above 93 or 95% may be used with advantage. Thus, for instance, I may employ for the purpose of the present invention pitches or tarry products which can be liquefied at the temperature of the reaction. Such pitches or tars may result from the destructive distillation of oils, coals, lignite and the like, or they may be the residue from the cracking process itself either in the actual cracking operation or in a preliminary distillation step. Natural tarry products, such as bitumens, may likewise be employed, and in addition liquids of very high decomposition or boiling points which contain carbon in suspension or in colloidal form. Thus the product sold under the trade name "Oildag" consisting of graphite suspended or deflocculated in a heavy oil and similar products in which graphite or other form of carbon is suspended in a very heavy oil or pitchy product, are suitable for the purpose of the present invention. Compounds which do not actually contain elemental carbon but which are rich in combined carbon and which are heavy in character or of very high boiling or decomposition point may likewise be used, though I prefer to employ compositions which contain carbon in the free state.

The conversion of the paraffins may be effected by passing them through the liquid material maintained at a suitable high temperature. If desired the paraffins may be mixed with other substances or compounds which tend to decrease the proportion of hydrogen, for example carbon monoxide or carbon dioxide, or even proportions of acetylenic hydrocarbons. I prefer to carry out the reaction at as high a temperature as possible consistent with maintaining the bath in a liquid state, and for this reason the above products which are of particularly high boiling or decomposition point are preferable. Temperatures of the order of 350 to 500° C. may be employed or even higher temperatures where this is feasible. If desired the reaction may be effected at pressures higher than atmospheric, for example up to 20 atmospheres, and such pressures may have the effect of raising the boiling or decomposition point of the reaction medium. Particularly high temperatures, for example up to 800 or 900° C. may be obtained by employing baths of molten metals or molten salts containing carbon in suspension, or suspensions of carbon in other liquid or liquefiable substances capable of withstanding the temperatures. The use of such high temperatures is particularly advantageous when methane is to be treated.

As previously indicated the invention particularly aims at the treatment of gaseous paraffins, such for example as methane, ethane and propane. It does not, however, exclude the treatment of liquid paraffins, and especially liquid paraffins which are easily vaporizable; and especially of boiling point under 150° C. or preferably below 100° C. for instance the butanes and pentanes. Such liquids may be brought to reaction either in the vapour state by passing the vapours through the baths or they may be introduced directly in the liquid form into the baths.

When the invention is applied to the treatment of "cracked gases", the gases as a whole may be subjected to the processes described, but preferably the gases are first treated to remove olefines, for instance by absorption in sulphuric acid.

The following example illustrates the invention, which is in no way limited thereby.

Example

A gas mixture comprising approximately equal quantities of ethane and propane is passed through a bath containing a cracking residue which comprises a very heavy oil holding in suspension a considerable quantity of free carbon. The bath is maintained at a temperature of 450° C. under a pressure of 5 atmospheres, and the gases are passed into the bath in the form of fine bubbles. The gases after leaving the reaction zone are treated to remove olefines, for example with concentrated sulphuric acid or a solid absorbent such as active charcoal, and may then advantageously be recirculated through the heavy oil bath.

What I claim and desire to secure by Letters Patent is:—

1. Process for the manufacture from saturated hydrocarbons of boiling point below 150° C. of hydrocarbons containing a lower percentage of hydrogen, comprising heating said saturated hydrocarbons in the gaseous phase at temperatures between 350 and 900° C. in the presence of liquid or semi-liquid compositions containing more than 80% free carbon in a finely divided form.

2. Process for the manufacture from saturated hydrocarbons of boiling point below 150° C. of hydrocarbons containing a lower percentage of hydrogen, comprising passing the said saturated hydrocarbon in the gaseous phase through a liquid composition comprising high boiling liquid hydrocarbons and more than 80% free carbon in a finely divided form at a temperature between 350° and 800° C.

3. Process for the manufacture from ethane of hydrocarbons containing a lower percentage of hydrogen, comprising passing the said ethane through a liquid composition comprising high boiling liquid hydrocarbons and more than 80% free carbon in a finely divided form at a temperature between 350 and 500° C.

4. Process for the manufacture from saturated hydrocarbons of boiling point below 150° C. of hydrocarbons containing a lower percentage of hydrogen, comprising passing the said saturated hydrocarbon in the gaseous phase through a liquid composition comprising high boiling liquid hydrocarbons and a substantial quantity of graphite at a temperature between 350° C. and 800° C.

5. Process for the manufacture from ethane of hydrocarbons containing a lower precentage of hydrogen, comprising passing ethane under a pressure of the order of 5 atmospheres through a liquid composition comprising high boiling liquid hydrocarbons and more than 80% free carbon in a finely divided form at a temperature between 350 and 500° C.

6. Process for the manufacture from saturated hydrocarbons of boiling point below 150° C. of hydrocarbons containing a lower percentage of hydrogen, comprising heating said saturated hydrocarbons in the gaseous phase under pressure at temperatures between 350 and 900° C. in the presence of liquid or semi-liquid compositions containing more than 80% free carbon in a finely divided form.

HENRY DREYFUS.